(12) United States Patent
Govindaraju et al.

(10) Patent No.: US 10,055,350 B2
(45) Date of Patent: Aug. 21, 2018

(54) CONTROLLED CACHE INJECTION OF INCOMING DATA

(71) Applicant: GOOGLE LLC, Mountain View, CA (US)

(72) Inventors: Rama Krishna Govindaraju, San Jose, CA (US); Liqun Cheng, San Jose, CA (US); Parthasarathy Ranganathan, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/533,307

(22) Filed: Nov. 5, 2014

(65) Prior Publication Data

US 2015/0324293 A1    Nov. 12, 2015

Related U.S. Application Data

(60) Provisional application No. 61/989,233, filed on May 6, 2014.

(51) Int. Cl.
G06F 12/00 (2006.01)
G06F 12/0862 (2016.01)
G06F 12/0868 (2016.01)
G06F 3/06 (2006.01)

(52) U.S. Cl.
CPC ........... G06F 12/0862 (2013.01); G06F 3/06 (2013.01); G06F 12/0868 (2013.01); *G06F 2212/602* (2013.01)

(58) Field of Classification Search
CPC .......... G06F 12/0862; G06F 12/0868; G06F 2212/602
See application file for complete search history.

(56) References Cited

U.S. PATENT DOCUMENTS

| 7,774,554 B2 | 8/2010 | Chaudhary |
| 7,958,314 B2 | 6/2011 | Gregg |
| 8,549,007 B1 | 10/2013 | Wormley et al. |
| 9,367,466 B2* | 6/2016 | Poremba ............. G06F 12/0862 |

(Continued)

OTHER PUBLICATIONS

International Search Report and Written Opinion in International Application No. PCT/US2015/029268, dated Jul. 27, 2015, 9 pages.

*Primary Examiner* — David X Yi
*Assistant Examiner* — Alan Otto
(74) *Attorney, Agent, or Firm* — Fish & Richardson P.C.

(57) ABSTRACT

Methods, systems, and apparatus, including computer programs encoded on a computer storage medium, for prefetching data. The methods, systems, and apparatus include actions of providing a request for data to an input-output device and receiving a set of memory addresses for the requested data. Additional actions include determining a subset of the memory addresses, providing a request for a processor to pre-fetch or inject data corresponding to the subset of the memory addresses, and receiving the requested data and the set of memory addresses. Additional actions include determining that the received data includes data for the subset of memory addresses that has been requested to be pre-fetched or injected, storing the data for the subset of memory addresses in a cache of the processor, and storing remaining data of the received data for the memory addresses in a main memory.

20 Claims, 4 Drawing Sheets

(56) References Cited

U.S. PATENT DOCUMENTS

| | | | |
|---|---|---|---|
| 2002/0174299 A1* | 11/2002 | Hayter | G06F 12/0888 |
| | | | 711/118 |
| 2006/0064518 A1 | 3/2006 | Bohrer | |
| 2010/0042787 A1 | 2/2010 | Auernhammer | |
| 2010/0070717 A1* | 3/2010 | Arimilli | G06F 12/0862 |
| | | | 711/141 |
| 2010/0228921 A1* | 9/2010 | Grossman | G06F 12/0897 |
| | | | 711/135 |
| 2013/0151761 A1 | 6/2013 | Kim et al. | |

* cited by examiner

CONTROLLED CACHE INJECTION OF INCOMING DATA

CROSS REFERENCE TO RELATED APPLICATION

This application claims the benefit of U.S. Provisional Application Ser. No. 61/989,233, filed on May 6, 2014, which is incorporated by reference.

TECHNICAL FIELD

This disclosure generally relates to processor caches.

BACKGROUND

A computer may be able to access data from a cache faster than the computer may be able to access data from main memory. Accordingly, to speed up a process that involves accessing data, the computer may store some fraction of the data in the cache instead of main memory in order to speed up execution.

SUMMARY

In general, an aspect of the subject matter described in this specification may involve a process for pre-fetching or pro-actively injecting incoming input-output data. A processor may include caches from which the processor may access data faster than the processor may access data from main memory. These caches may be associated with different levels. For example, a multi-core processor may include multiple caches of a first level, e.g., L1 caches, and second level cache, e.g., L2 caches, each associated with a particular core of the processor, and a last level cache, e.g., a L3 cache, collectively shared by the cores. The different levels may be associated with different access speeds and sharing models. For example, data from first level caches may be accessed faster than data from lower level caches, e.g., last level caches.

To speed up a process that involves accessing data, a system may pre-fetch the data into a cache of the processor. Pre-fetching data may include accessing and storing data in a cache before the data is used by a processor. For example, if a system determines a processor may use data stored in a particular memory address of main memory after one microsecond, before the one microsecond passes, the system may issue a pre-fetch instruction to access data stored in the particular memory address of main memory and store the accessed data in a cache of a processor so that it is available at low latency to the processor in a just in time fashion. After the one microsecond and when the processor needs to use the data, the processor may access the data from the cache instead of from main memory resulting in faster execution because the processor does not have to stall waiting for data from main memory.

In an implementation, a system may initially inject all data received from an input-output device in a last level cache of a processor. For example, the system may assume that all data that is newly received by an input-output device may soon be needed by the processor. Accordingly, the system may cache all the newly received data in a L3 cache of the processor. However, all the received data may not be quickly used. For example, half the received data may be immediately used, but half the data may not be used until a minute or much later. Caching data that is not quickly used may replace existing data in the cache that will be quickly used, polluting the cache which also may be referred to as polluting the working set in the cache. In another example, in the case of streaming data, e.g., a large amount of incoming data, performance inefficiencies may occur when later data overwrites the earlier data before the earlier data is consumed by the processor and incorporated into an ongoing computation. Furthermore, accessing data from the last level cache may be slower than accessing data from the first level cache. Accordingly, caching data in the last level cache instead of the first level cache may slow down processing by the processor, although the processing may still be faster than if no caching were performed.

In another implementation, instead of initially pre-fetching all data received from the input-output device in a last level cache of the processor, the system may pre-fetch a subset of data received from the input-output device into a first level cache of the processor. The subset of data may be a prefix or header part of the data. For example, the system may pre-fetch the first three cache-lines of data out of twenty cache-lines of data received from the input-output device, and cache data for the first three cache-lines into a L1 cache of a particular core of the processor. As the data stored in the first level cache is processed, the system may use just-in-time pre-fetch, which may also be referred to as stream pre-fetching, to access the remaining portions from main memory and store the remaining portions in the first level cache just before the processor consumes the remaining portions and absorbs it into the ongoing computation. This may be important as the first level cache may be small and any injection into the first level cache may need to be controlled and only for a first few cache-lines.

In pre-fetching the subset, the system may determine an amount of the data that is likely to be quickly used by the processor. For example, the first level cache may be represented as a two dimensional array with eight columns and sixty four rows, each row representing a cache-line, where each cell represents a memory address and the determined amount of data may correspond to a number of rows, e.g., one through sixty four rows. The system may then store data corresponding to the determined amount in a first level cache of the processor, and store data corresponding to the remaining portions of the received data in main memory. Accordingly, the system may reduce cache pollution and increase data access speed.

In some aspects, the subject matter described in this specification may be embodied in methods that may include the actions of providing, by a user process, a request for data to an input-output device and in response to providing the request for data to the input-output device, receiving, by the user process and from the input-output device, a set of memory addresses for the requested data. Additional actions include in response to receiving the set of memory addresses for the requested data, determining, by the user process, a subset of the memory addresses for the requested data and in response to determining the subset of the memory addresses for the requested data, providing, by the user process and to a processor, a request for a processor to pre-fetch data corresponding to the subset of the memory addresses for the requested data. Further actions include after providing the request for the processor to pre-fetch data corresponding to the subset of the memory addresses for the requested data, receiving, by a memory controller, the requested data and the set of memory addresses for the requested data. Additional actions include in response to receiving, by the memory controller, the requested data and the set of memory addresses for the requested data, determining, by the memory controller, that the received data includes data for the subset of memory addresses that has been requested to be pre-fetched, and in response to determining that the received data includes the data for the subset of memory addresses that has been requested to be pre-fetched, storing, by the memory controller, the data for the subset of memory addresses in a first level cache of the processor and storing remaining data of the received data for the memory addresses in a main memory.

Other versions include corresponding systems, apparatus, and computer programs, configured to perform the actions of the methods, encoded on computer storage devices.

These and other versions may each optionally include one or more of the following features. For instance, in some implementations determining a subset of the memory addresses for the requested data includes determining a number of memory addresses to pre-fetch and selecting the determined number of the memory addresses from the set of memory addresses as the subset of memory addresses.

In certain aspects, providing a request for a processor to pre-fetch data corresponding to the subset of the memory addresses for the requested data includes providing an instruction indicating the subset of memory addresses and indicating that the subset of memory addresses are to be pre-fetched.

In some aspects, additional actions include receiving the request for the processor to pre-fetch data corresponding to the subset of the memory addresses for the requested data, selecting the first level cache of the processor from multiple first level caches, and in response to receiving the request for the processor to pre-fetch data corresponding to the subset of the memory addresses for the requested data, caching the memory addresses in the first level cache of the processor.

In some implementations, additional actions include in response to receiving the requested data by the input-output device, issuing a DMA write operation indicating the requested data and the memory addresses, where receiving, by the memory controller, the requested data and the set of memory addresses for the requested data, includes receiving the DMA write operation.

In certain aspects, storing, by the memory controller, the data for the subset of memory addresses in a first level cache of the processor and storing remaining data of the received data for the memory addresses in a main memory, includes triggering the processor to store the data for the subset of memory addresses in the first level cache and triggering storage of the remaining data of the received data for the memory addresses in the main memory.

In some aspects, the memory controller is included in the processor.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like symbols in the various drawings indicate like elements.

DETAILED DESCRIPTION

Figure 1A:
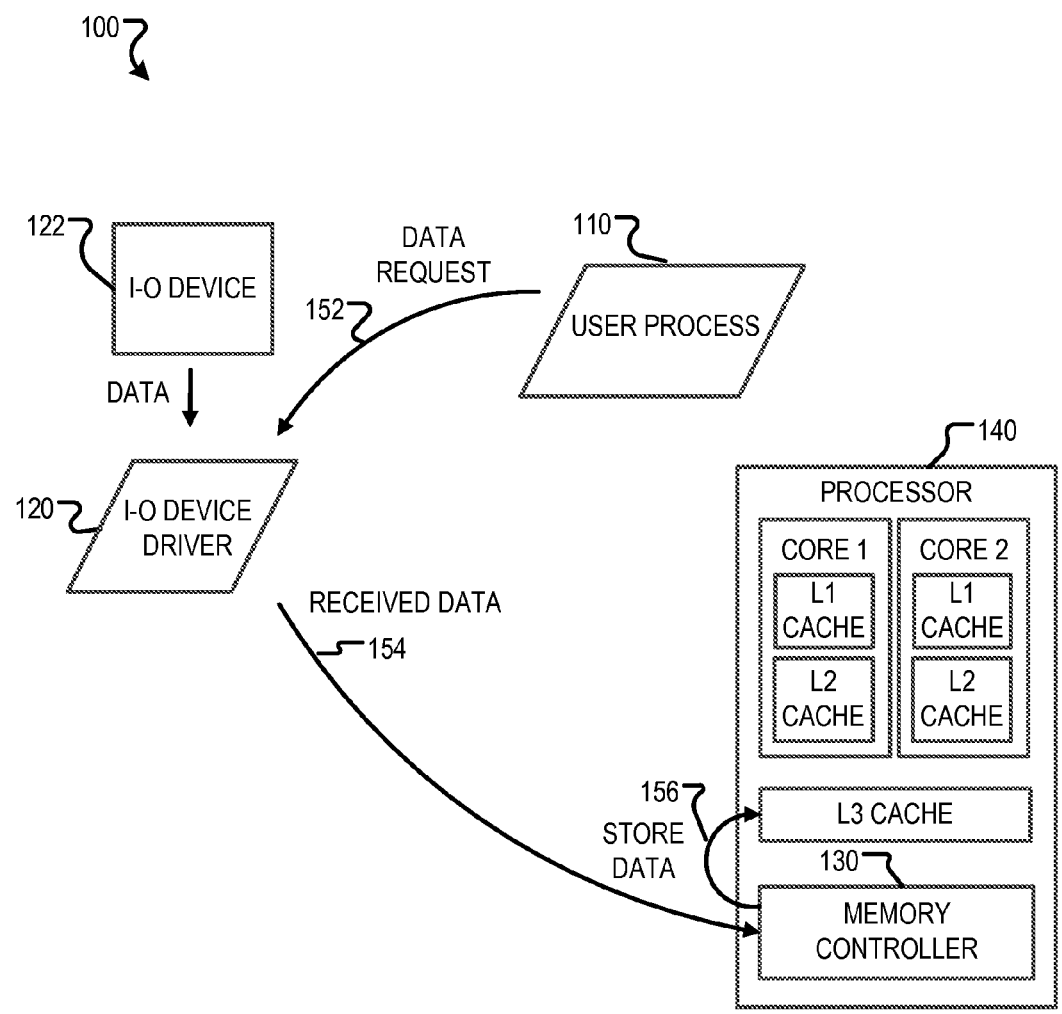
FIG. 1A is a block diagram of a system for pre-fetching data in a last level cache of a processor.

FIG. 1A is a block diagram of a system 100 for pre-fetching data in a last level cache of a processor. The system 100 may generally include a user process 110, an input-output (I-O) device driver 120 for an I-O device 122, and a memory controller 130 that is part of a processor 140. The system 100 may be a computing device, e.g., a server, a desktop computer, notebook computer, a mobile phone, or a tablet computer.

The user process 110 may be an application that uses data received from the I-O device 122. For example, the user process 110 may be a web browser application that uses webpage data received from an I-O device 122 that is a network interface card. To use the data, the user process 110 may provide a request for the data to the I-O device driver 120 of the I-O device 122 (152). For example, a web browser may provide a data request for webpage data for a particular website to a network interface card driver that controls a network interface device. However, in certain other examples not shown, the user process 110 may communicate with the I-O device 122 via user space communication using a user buffer mapped to the I-O device 122 instead of with an I-O device driver 120 (this mapping may be enabled by the I-O device driver 120). In this case, the user process 110 may directly handshake with the I-O device 122 for sending and receiving data (after a setup is done during initialization by the I-O device driver 120).

The I-O device driver 120 may receive the data request from the user process 110 and control the I-O device 122 to receive data. For example, a network interface card driver may receive a request from a web browser for data for a webpage and control the network interface card to obtain the data for the webpage. In some implementations, the I-O device 122 may be a network interface card, a hard disk, a CD-ROM drive, a scanner, a sound card, other kinds of Peripheral Component Interconnect Express (PCIe) attached I-O devices such as a solid-state drive (SSD), non-volatile memory, or other devices connected to an I-O interface. The I-O device driver 120 may provide the received data to the memory controller 130 (154). For example, the I-O device driver 120 may issue a direct memory access (DMA) write operation indicating the received data.

The memory controller 130 that is part of the processor 140 may receive the data from the I-O device driver 120 and cache the data in a last level cache of the processor 140 (156). For example, the memory controller 130 may receive a DMA write operation indicating webpage data from a network interface card driver and cache the webpage data in a L3 cache of the processor 140.

However, some or all of the data cached in the last level cache of the processor 140 may not be quickly used. Thus, caching the data may pollute the regular working set of the last level cache. Furthermore, accessing data from the last level cache may be slower than accessing data from a first level cache of the processor. Accordingly, data cached in the last level cache instead of the first level cache may slow down processing by the processor, although the processing may still be faster than if no caching were performed.

Figure 1B:
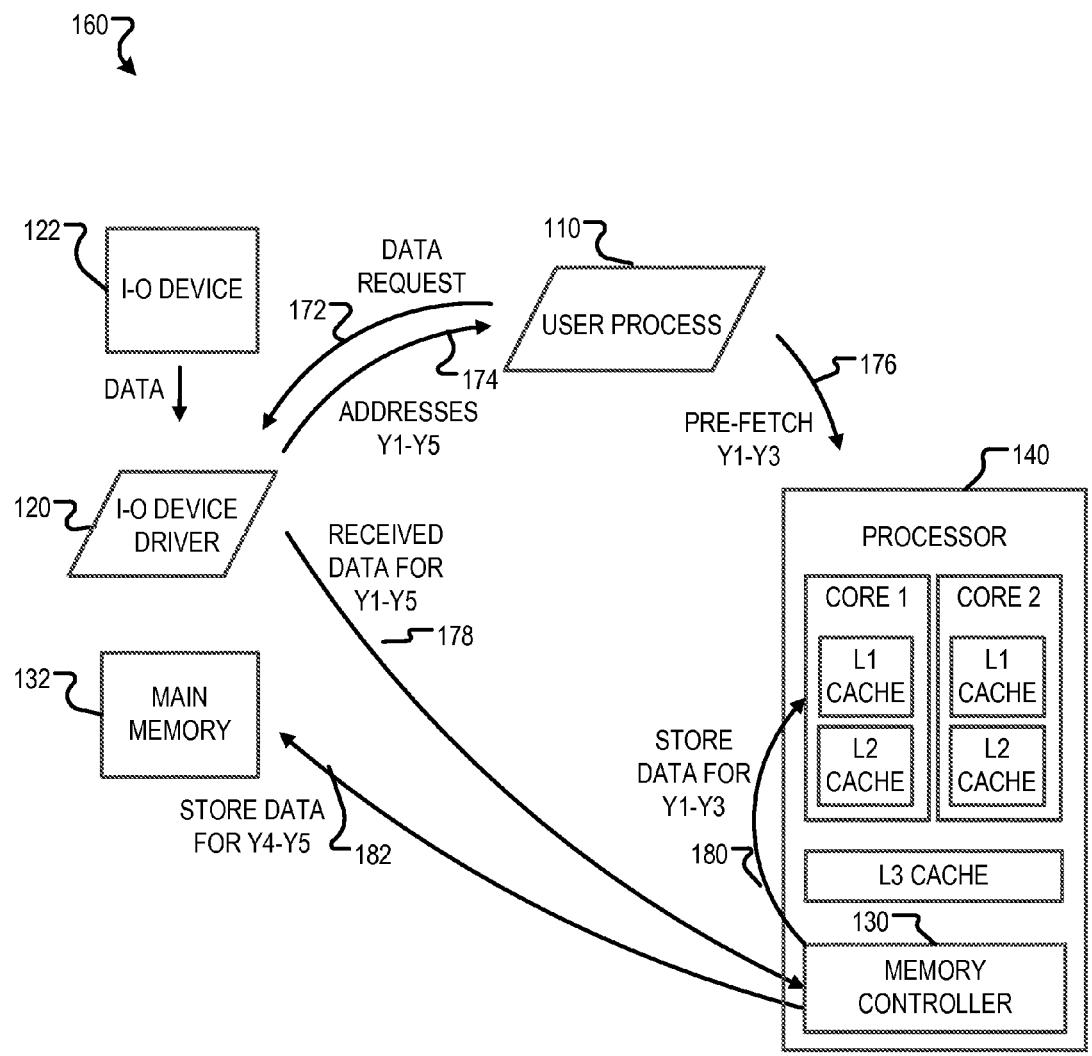
FIG. 1B is a block diagram of a system for pre-fetching data in a first level cache of a processor.

FIG. 1B is a block diagram of a system 160 for pre-fetching data in a first level cache of a processor 140. The system 160 may generally include the user process 110, the I-O device driver 120 for the I-O device 122, and the memory controller 130 that is part of the processor 140. The system 160 may be a computing device, e.g., a server, a desktop computer, notebook computer, or a mobile phone.

The user process 110 may be an application that uses data received from the I-O device 122. For example, the user process 110 may be a web browser application that uses webpage data received from an I-O device 122 that is a network interface card. To use the data, the user process 110 may provide a data request to the I-O device driver 120 of the I-O device 122 (172). For example, a web browser may provide a data request for webpage data to a network interface card driver that controls a network interface device.

In response to data requests, the user process 110 may initially receive memory addresses from the I-O device driver 120 (174). The memory addresses may indicate memory addresses in which data received by the I-O device 122 in response to the data request may be stored. For example, the user process 110 may receive an indication that the memory addresses Y1-Y5 will store data that is received by the I-O device 122 in response to a request for webpage data.

In response to receiving the memory addresses, the user process 110 may determine a subset of the memory addresses to pre-fetch. For example, the user process 110 may determine to pre-fetch the subset of memory addresses Y1-Y3 from a set of memory addresses Y1-Y5. The user process 110 may determine the subset of memory addresses to pre-fetch based on determining a number of the first few addresses in the set of memory addresses to pre-fetch, and selecting the first number of addresses from the set of memory addresses. For example, the user process 110 may determine to pre-fetch two, three, or four addresses in the set of memory addresses, and select the first two, three, or four addresses, respectively, from the set of memory addresses. In some implementations, the memory addresses of a set of memory addresses may be contiguous and the first memory address may be the memory address with the lowest value. For example, memory address Y5 may have the value of memory address of Y1 increased by four.

The user process 110 may determine the number of memory addresses to pre-fetch. In one implementation, the user process 110 may constantly use the same number. For example, for a particular user process, the number of addresses to pre-fetch may always be three addresses. For another particular user process, the number of addresses to pre-fetch may always be two addresses.

In another implementation, a user process 110 may dynamically determine the number of addresses to pre-fetch. For example, if the user process 110 determines that the data may be quickly processed, the user process 110 may determine to pre-fetch four memory addresses. In another example, if the user process 110 determines that the data may not be quickly processed, the user process 110 may determine to pre-fetch two memory addresses.

In an additional example, the user process 110 may determine the number of addresses to pre-fetch based on a duty cycle of processing time for each of the cache-lines to be incorporated into the ongoing computation. For example, for higher duty cycles the user process 110 may determine a high number and for lower duty cycles the user process 110 may determine a lower number.

In yet another example, the user process 110 may determine the number of addresses to pre-fetch to be half the number of memory addresses that receive data, rounded up. For example, if data is received for a set of five memory addresses, the user process 110 may determine the number of addresses to pre-fetch is half of five, rounded up, resulting in three.

In some implementations, the user process 110 may determine the subset of memory addresses to pre-fetch based on determining a number of cache-lines of memory addresses to pre-fetch, determining the first cache-lines up to the determined number, and including the memory addresses in the determined first cache-lines in the subset of memory addresses to pre-fetch.

In response to determining the subset of memory addresses, the user process 110 may provide a pre-fetch command to the processor 140 instructing the processor 140 to pre-fetch the determined subset of memory addresses (176). For example, the user process 110 may provide a pre-fetch command 176 for addresses Y1-Y3 to the processor 140. In another implementation, the user process 110 may provide a pre-fetch command for the memory addresses and the memory controller or another engine may instead determine the subset of memory addresses to pre-fetch.

In some implementations, the user process 110 may determine which cache level or cache partition to pre-fetch the memory addresses into. For example, the user process 110 may determine to pre-fetch the memory addresses into a second level cache and provide a pre-fetch command 176 for pre-fetching memory addresses into a second level cache of the processor 140.

In regards to the I-O device driver 120, the I-O device driver 120 may receive the data request from the user process 110 and control the I-O device 122 to receive data. For example, a I-O device driver 120 in the form of a network interface card driver may receive a request from a web browser for data for a webpage and control the I-O device 122 in the form of a network interface card to receive the data for the webpage. In some implementations, the I-O device 122 may alternatively be a hard disk, a CD-ROM drive, a DVD-ROM, a scanner, a sound card, or any other peripheral I-O device.

In response to receiving the data request, the I-O device driver 120 may determine memory addresses for the data. For example, the I-O device driver 120 may determine that a request for webpage data may be stored in the memory addresses Y1-Y5. The I-O device driver 120 may determine the memory addresses itself. For example, the I-O device driver 120 may determine that the memory addresses Y1-Y5 are the next addresses to store data in a ring buffer, and in response, determine that the memory addresses Y1-Y5 will store the data.

Additionally or alternatively, the I-O device driver 120 may determine the memory addresses in response to information from an operating system or the user process 110. For example, in response to the data request, the I-O device driver 120 may query the operating system or the user process 110 for memory addresses to store data received in response to the data request and determine to store the received data in memory addresses identified by the operating system or the user process 110.

After determining the memory addresses for the data to be received, the I-O device driver 120 may then receive the data and provide the received data to the memory controller 130 (178). For example, after receiving data for the memory addresses Y1-Y5, the I-O device driver 120 may issue a DMA write operation indicating the memory addresses Y1-Y5 and the received data for the memory addresses.

As mentioned above, in some implementations, the user process 110 and memory controller 130 may communicate with the I-O device 122 via user space communication using a user buffer mapped to the I-O device 122 instead of with an I-O device driver 120. Thus, the communications (172, 174, and 178) shown associated with the I-O device driver 120 may instead be associated with a user buffer.

In regards to the memory controller 130, the memory controller 130 may be part of the processor 140 and may receive memory addresses and data for the memory addresses from the I-O device driver 120 (178). For example, the memory controller 130 may receive a DMA write operation issued by the I-O device driver 120 that indicates the memory addresses Y1-Y5 and data for the memory addresses.

In response to receiving the memory addresses and the data for the memory addresses from the I-O device driver 120, the memory controller 130 may determine if the memory addresses have been cached in a first level cache of the processor 140. For example, the memory controller 130 may determine if any of the memory addresses Y1-Y5 indicated in a DMA write operation have been cached in any of the L1 caches of the processor 140.

The memory controller 130 may determine if the memory addresses have been cached in a first level cache of the processor 140 by monitoring the memory addresses cached in caches of the processor 140. For example, the memory controller 130 may track which memory addresses are stored in each cache of the processor 140. The memory controller 130 may determine if the memory addresses have been cached in a first level cache of the processor 140 by accessing information describing what is stored in the caches of the processor 140. The information may be stored in the form of a bitmap or bitmask, stored in the last level cache of the processor 140, that indicates the memory addresses that correspond to portions of the caches.

The memory controller 130 may store data for the memory addresses into the cache (180). For example, the memory controller 130 may determine that the memory addresses Y1-Y3 are cached in the L1 cache of Core 1, and in response, the memory controller 130 may store the data corresponding to the memory addresses Y1-Y3 in the cache in association with the memory addresses. In another example, the memory controller 130 may determine that the memory addresses Y1-Y3 are cached in the L1 cache of Core 2, and in response, the memory controller 130 may store the data corresponding to the memory addresses Y1-Y3 in the cache in association with the memory addresses.

The memory controller 130 may store remaining data for memory addresses that are determined not to be cached in a cache of the processor 140 into main memory (182). For example, the memory controller 130 may determine that the memory addresses Y4-Y5 are not cached in any L1 caches of the processor 140, and store the remaining data for the memory addresses Y4-Y5 into main memory.

The processor 140 may include multiple cores, each core including an associated first level cache, e.g., a L1 cache, and a last level cache, e.g., a L3 cache, shared by the cores. For example, the processor 140 may include two cores, each core including a central processing unit and a L1 cache, where the two cores share a L3 cache.

The processor 140 may receive a pre-fetch command from the user process 110. The pre-fetch command may indicate one or more memory addresses to pre-fetch. For example, the pre-fetch command may indicate the memory addresses Y1-Y3. In response to the pre-fetch command, the processor 140 may cache the memory addresses in a first level cache of the core that executes the pre-fetch command. For example, if Core 1 executes the pre-fetch command, the processor 140 may cache the memory addresses Y1-Y3 in the L1 cache of Core 1. In another example, if Core 2 executes the pre-fetch command, the processor 140 may cache the memory addresses Y1-Y3 in the L1 cache of Core 2.

Different configurations of the systems 100 and 160 may be used where functionality of the user process 110, the I-O device driver 120, the I-O device 122, the memory controller 130, the main memory 132, and the processor 140 may be combined, further separated, distributed, or interchanged. The systems 100 and 160, and may be implemented in a single device or distributed across multiple devices.

Figure 2:
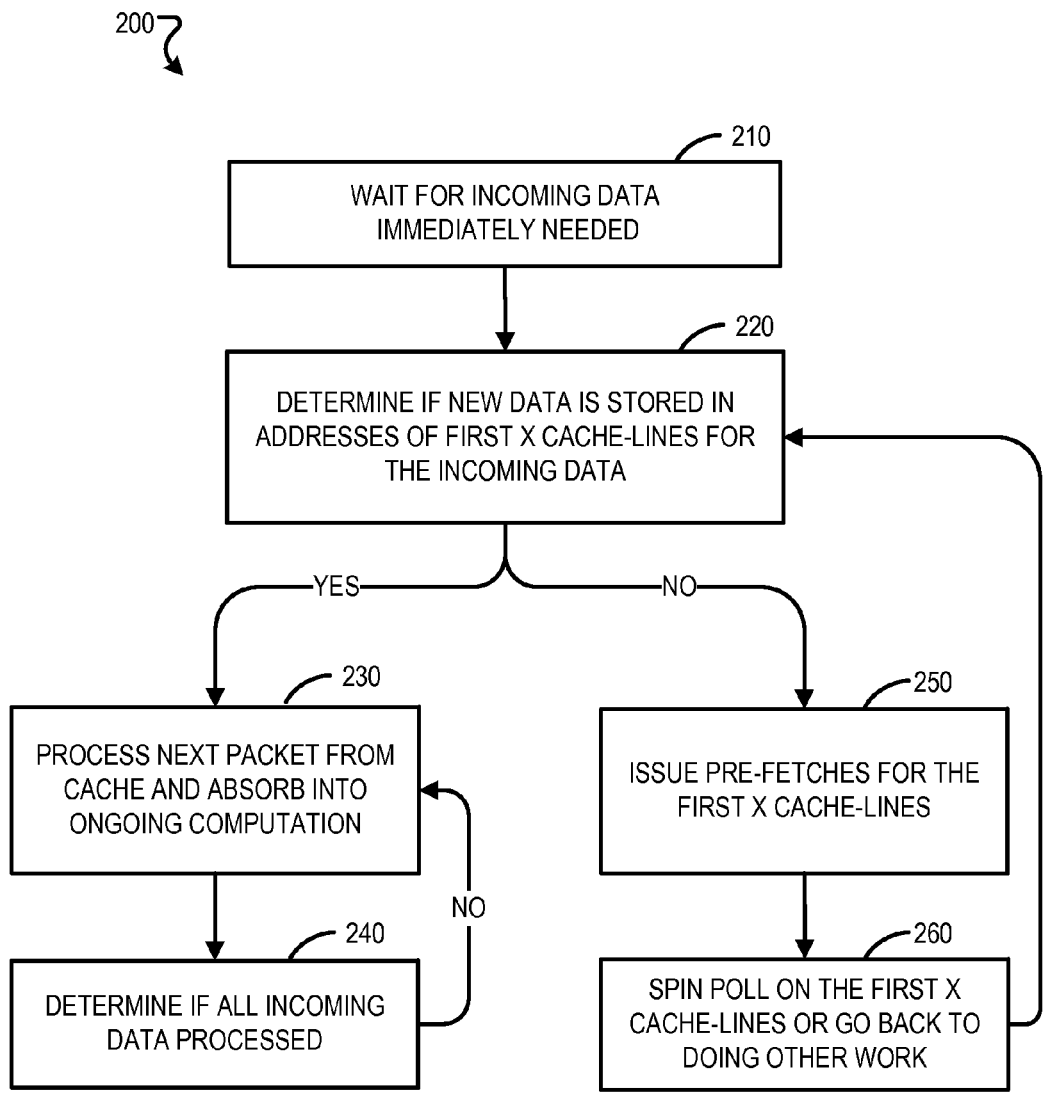
FIG. 2 is a flowchart of an example process that is possibly waiting for incoming input-output data and which issues prefetches into a first level cache of a processor.

FIG. 2 is a flowchart of an example process 200 that is possibly waiting for incoming input-output data and which issues prefetches into a first level cache of a processor. The process 200 may be performed by the I-O device driver 120 or user process 110, executing on the processor 140. The process 200 may include waiting for incoming data that is immediately needed (210). For example, the process 200 may be waiting for incoming data from a hard drive or a network interface card.

The process 200 may include determining if new data is stored in addresses of a first, e.g., X, of cache-lines for the incoming data (220). The new data may represent the incoming data. For example, the process may determine that the first two cache-lines for the incoming data correspond to target addresses Y1-Y8 and determine whether new data representing the incoming data is stored in the target addresses.

If the process 200 determines that new data is stored in the target addresses, the process 200 may include processing the next packet from the cache and absorbing the data into ongoing computation (230). For example, the process 200 may include obtaining the data for a next data packet from the target addresses of the cache-lines and processing using the obtained data.

The process 200 may include determining if all incoming data has been processed (240). For example, the process 200 may include determining if additional data packets have not been processed. If all incoming data has not been processed, the process 200 may repeat with processing the next packet until all data packets have been processed (230).

If the process 200 determines that new data is not stored in the target addresses, the process 200 may issue pre-fetches for the first number of cache-lines (250). For example, the process 200 may determine that new data is not stored in the target addresses of the first number of cache-lines and may issue a pre-fetch so that the cache-lines are allocated in a first level cache of the processor.

The process 200 may include spin polling on the first number of cache-lines or going back to doing other work (260). For example, the process 200 may include waiting until new data representing the incoming data is stored in the first number of cache-lines or performing other processes that do not need the incoming data.

Figure 3:
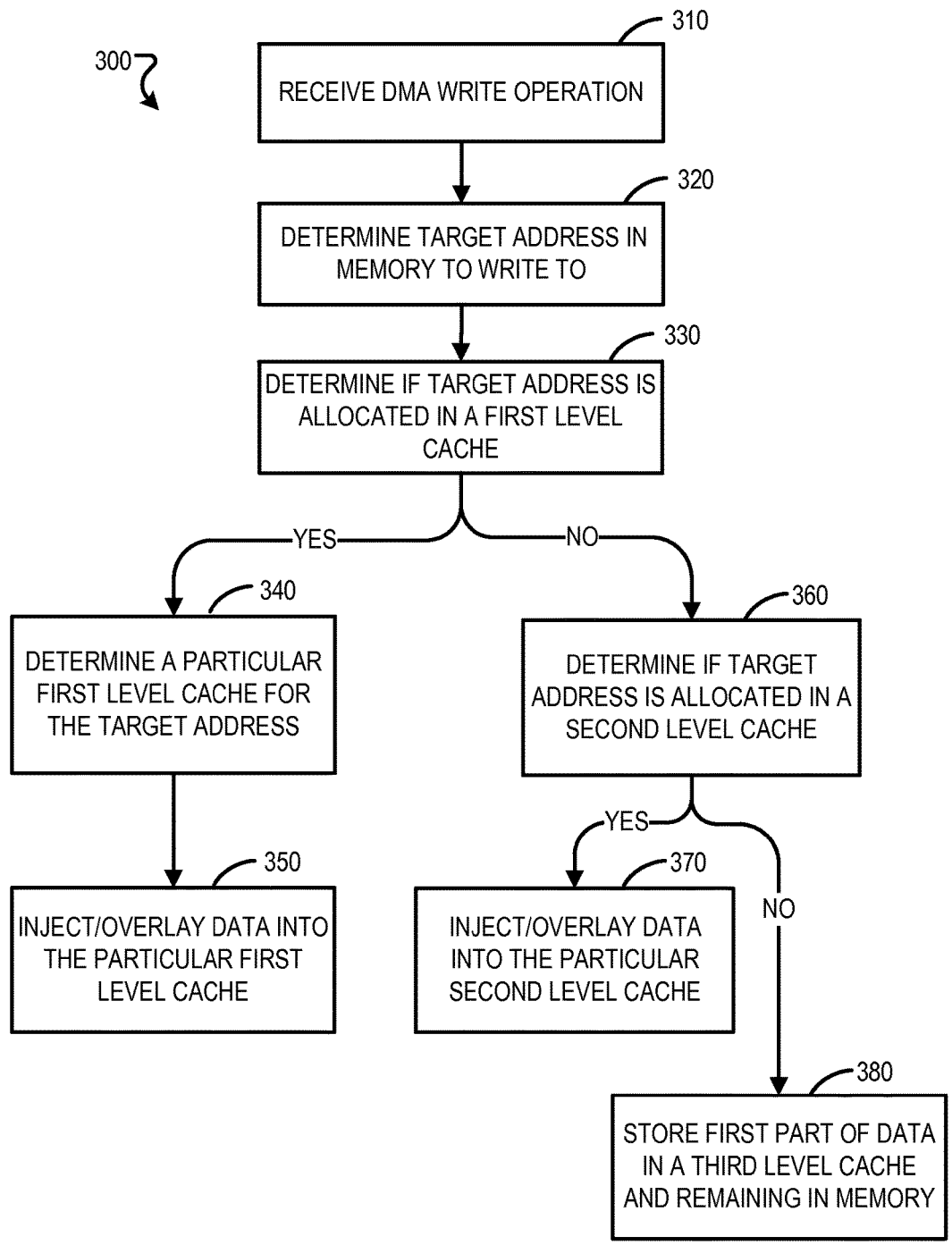
FIG. 3 is a flowchart of an example process for a write transaction into system memory from an input-output device with possible injection into first level or second level caches.

FIG. 3 is a flowchart of an example process 300 for a write transaction into system memory from an input-output device with possible injection into first level or second level caches. The process 300 may include receiving a DMA write operation that includes a header and data (310). The header may indicate where the data is to be stored.

The process 300 may include determining one or more target addresses in memory in which to write the data (320). For example, from the header, the process 300 may include determining that the data is to be written in addresses Y1-Y8.

The process 300 may include determining if the one or more target addresses are allocated in a first level cache (330). For example, the process 300 may include determining, using the memory controller 130, whether those target addresses are allocated in a first level cache of any of the first level caches of the processor 140.

If the process 300 determines that one or more target addresses are allocated in a first level cache, the process 300 may include determining a particular first level cache for the target address (340). For example, the process 300 may include determining that a target address is allocated in a first level cache of a first core or in a first level cache of a second core. In an example, if the process 300 determines that the target address is stored in first level caches of multiple cores, the process 300 may select one of the first level caches. For example, the process 300 may select the first level cache of the most recently core.

The process 300 may then inject and/or overlay the data of the DMA write operation into the particular first level cache (350). For example, the process 300 may include writing the data corresponding to the target addresses allocated in the first level cache in the allocated addresses.

If the process 300 determines that one or more target addresses are not allocated in a first level cache, the process 300 may include determining if the one or more target addresses are allocated in a second level cache (360). For example, the process 300 may include determining, using the memory controller 130, whether those target addresses are allocated in a second level cache of any of the second level caches of the processor 140.

If the process 300 determines that one or more target addresses are allocated in a second level cache, the process 300 may include determining a particular second level cache for the target address (360). For example, the process 300 may include determining that a target address is allocated in a second level cache of a first core or in a second level cache of a second core. In an example, if the process 300 determines that the target address is stored in second level caches of multiple cores, the process 300 may select one of the second level caches. For example, the process 300 may select the second level cache of the most recently core.

The process 300 may then inject and/or overlay the data of the DMA write operation into the particular second level cache (370). For example, the process 300 may include writing the data into the allocated addresses in the second level cache.

If the process 300 determines that one or more target addresses are not allocated in a second level cache, the process 300 may include storing a first part of the data into a third level cache of the processor 140 and storing the remaining data into memory. For example, the process 300 may include storing data for addresses Y1-Y3 in a third level cache of the processor 140 and store data for addresses Y4-Y5 in memory.

In an alternate implementation of a process for caching data in a first level cache of a processor, the user process 110 may provide a data request to the I-O device driver 120. For example, a user process in the form of a media player may provide a data request for media data to an I-O device driver in the form of a DVD-ROM driver.

The process may continue with the I-O device driver 120 receiving the data request and determining addresses to store the data. For example, a DVD-ROM driver may determine data to be retrieved from a DVD-ROM device will be stored in addresses Y10-Y20. The I-O device driver 120 may provide the determined addresses to the user process 110.

For example, the DVD-ROM driver may indicate to a media player that addresses Y10-Y20 will store the media data.

The process may continue with the user process 110 receiving the memory addresses. For example, the media player may receive an indication that the memory addresses Y10-Y20 will store data responsive to a data request provided by the media player.

The process may continue with the user process 110 determining a subset of addresses to cache. For example, a media player may determine that data is quickly consumed and determine to pre-fetch the first five memory addresses, and determine that the first five memory addresses are Y10-Y14. In another implementation, the media player may determine that data will not be quickly consumed and determine to pre-fetch only the first memory address, and determine to pre-fetch memory address Y10.

The process may continue with the user process 110 providing a pre-fetch command for a subset of addresses. For example, the user process 110 may provide a pre-fetch command for the processor 140 to pre-fetch the memory addresses Y10-Y14.

The process may continue with the memory controller 130 that is part of the processor 140 receiving the pre-fetch command and, in response, caching the subset of addresses in a first level cache. For example, in response to receiving a pre-fetch command for the memory addresses Y10-Y14, the processor 140 may allocate space for the memory addresses Y10-Y14 in a L1 cache of Core 2 of the processor 140.

The process may continue with the I-O device driver 120 receiving data for the addresses. For example, a DVD-ROM device driver may receive media data for the memory addresses Y10-Y14. The I-O device driver 120 may provide the received data and memory addresses to the memory controller 130 in the processor 140. For example, once media data is received from a DVD-ROM device by a DVD-ROM driver, the DVD-ROM driver may issue a DMA write operation indicating the memory addresses Y10-Y20 and the media data for the memory addresses.

The process may continue with the processor 140 determining if the addresses are cached. For example, the memory controller 130 in the processor 140 may determine if any of the memory addresses Y10-Y20 are stored in any of the caches of the processor 140.

The process may continue with the memory controller 130 in the processor 140 storing data corresponding to a subset of memory addresses in the cache of the processor 140 and storing the remaining data in the main memory. For example, in response to determining that the memory addresses Y10-Y14 out of the memory addresses Y10-Y20 are stored in the L1 cache of Core 2 of the processor 140, the memory controller 130 may store data for the memory addresses Y10-Y14 in the L1 cache of Core 2 and store the remaining data for the memory addresses Y15-Y20 in main memory 132.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
providing, by a user process to an input-output device, a request for data that is not yet available, wherein the user process is a software application that uses data received from the input-output device;
in response to providing to the input-output device the request for data that is not yet available receiving, by the user process and from the input-output device, a set of memory addresses for the requested data that is not yet available;
in response to receiving the set of memory addresses from the input-output device for the requested data that is not yet available, determining, by the user process, a subset of the memory addresses corresponding to data to be cached by a processor;
in response to determining the subset of the memory addresses corresponding to data to be cached by the processor,
determining, by the user process, a cache level in which to pre-fetch the subset of memory addresses in a cache of the processor;
providing, by the user process to the processor, a request for the processor to allocate space in the cache of the processor to cache data corresponding to the subset of the memory addresses at the determined cache level for the requested data that is not yet available;
after providing the request for the processor to allocate space to cache data corresponding to the subset of the memory addresses for the requested data and once the requested data is available, receiving, by a memory controller, a direct memory access write operation from the input-output device indicating the requested data and the set of memory addresses corresponding to the requested data;
in response to receiving, by the memory controller, the requested data and the set of memory addresses corresponding to the requested data, determining, by the memory controller, that the received data includes data for the subset of memory addresses that the processor has been requested by the user process to cache;
in response to determining that the received data includes the data for the subset of memory addresses that the processor has been requested by the user process to cache, storing, by the memory controller, the data for the subset of memory addresses in the allocated space of the cache of the processor and storing remaining data of the received data for the memory addresses in a main memory; and
as the data for the subset of memory addresses in the allocated space of the cache of the processor is being processed by the processor, pre-fetching the remaining data of the received data for the memory addresses in the main memory and storing the remaining data in the cache.

2. The method of claim 1, wherein storing, by the memory controller, the data for the subset of memory addresses in a cache of the processor and storing remaining data of the received data for the memory addresses in a main memory, comprises:
storing, by the memory controller, the data for the subset of memory addresses in a first level cache of the processor and storing remaining data of the received data for the memory addresses in a main memory.

3. The method of claim 1, wherein determining a subset of the memory addresses corresponding to data to be cached by a processor comprises:
determining a number of memory addresses to cache; and
selecting the determined number of the memory addresses from the set of memory addresses as the subset of memory addresses.

4. The method of claim 1, wherein determining a subset of the memory addresses corresponding to data to be cached by a processor comprises:
dynamically selecting memory addresses from the set of memory addresses as the subset of memory addresses based on a user process or system behavior.

5. The method of claim 1, wherein providing a request for the processor to cache data corresponding to the subset of the memory addresses for the requested data comprises:
providing an instruction indicating the subset of memory addresses and indicating that the subset of memory addresses are to be cached.

6. The method of claim 1, comprising:
receiving, by the processor, the request for the processor to cache data corresponding to the subset of the memory addresses for the requested data;
selecting, by the processor, the cache of the processor from multiple caches; and
in response to receiving the request for the processor to cache data corresponding to the subset of the memory addresses for the requested data, caching the memory addresses in the cache of the processor selected by the processor.

7. The method of claim 1, comprising:
in response to receiving the requested data by the input-output device, issuing a DMA write operation indicating the requested data and the memory addresses,
wherein receiving, by the memory controller, the requested data and the set of memory addresses corresponding to the requested data, comprises receiving the DMA write operation.

8. The method of claim 1, wherein storing, by the memory controller, the data for the subset of memory addresses in a cache of the processor and storing remaining data of the received data for the memory addresses in a main memory, comprises:
triggering the processor to store the data for the subset of memory addresses in the cache; and triggering storage of the remaining data of the received data for the memory addresses in the main memory.

9. The method of claim 1, wherein providing a request for the processor to cache data corresponding to the subset of the memory addresses for the requested data, comprises:
providing a request for the processor to cache data corresponding to the subset of the memory addresses for the requested data into a specific partition of the cache.

10. The method of claim 1, wherein in response to receiving, by the memory controller, the requested data and the set of memory addresses corresponding to the requested data, determining, by the memory controller, that the received data includes data for the subset of memory addresses that the processor has been requested by the user process to be cached comprise:
determining, by the memory controller, that one or more of the memory addresses of the set of memory addresses received from the input-output device has been requested by the user process to be cached by the processor.

11. A system comprising:
one or more computers; and
one or more storage devices storing instructions that are operable, when executed by the one or more computers, to cause the one or more computers to perform operations comprising:
providing, by a user process to an input-output device, a request for data that is not yet available, wherein the user process is a software application that uses data received from the input-output device;
in response to providing to the input-output device the request for data that is not yet available, receiving, by the user process and from the input-output device, a set of memory addresses for the requested data that is not yet available;
in response to receiving the set of memory addresses from the input-output device for the requested data that is not yet available, determining, by the user process, a subset of the memory addresses corresponding to data to be cached by a processor;
in response to determining the subset of the memory addresses corresponding to data to be cached by the processor,
determining, by the user process, a cache level in which to pre-fetch the subset of memory addresses in a cache of the processor;
providing, by the user process to the processor, a request for the processor to allocate space in the cache of the processor to cache data corresponding to the subset of the memory addresses at the determined cache level for the requested data that is not yet available;
after providing the request for the processor to allocate space to cache data corresponding to the subset of the memory addresses for the requested data and once the requested data is available, receiving, by a memory controller, a direct memory access write operation from the input-output device indicating the requested data and the set of memory addresses corresponding to the requested data;
in response to receiving, by the memory controller, the requested data and the set of memory addresses corresponding to the requested data, determining, by the memory controller, that the received data includes data for the subset of memory addresses that the processor has been requested by the user process to cache;
in response to determining that the received data includes the data for the subset of memory addresses that the processor has been requested by the user process to cache, storing, by the memory controller, the data for the subset of memory addresses in the allocated space of the cache of the processor and storing remaining data of the received data for the memory addresses in a main memory; and
as the data for the subset of memory addresses in the allocated space of the cache of the processor is being processed by the processor, pre-fetching the remaining data of the received data for the memory addresses in the main memory and storing the remaining data in the cache.

12. The system of claim 11, wherein storing, by the memory controller, the data for the subset of memory addresses in a cache of the processor and storing remaining data of the received data for the memory addresses in a main memory, comprises:
storing, by the memory controller, the data for the subset of memory addresses in a first level cache of the processor and storing remaining data of the received data for the memory addresses in a main memory.

13. The system of claim 11, wherein determining a subset of the memory addresses corresponding to data to be cached by a processor comprises:
determining a number of memory addresses to cache; and
selecting the determined number of the memory addresses from the set of memory addresses as the subset of memory addresses.

14. The system of claim 11, wherein determining a subset of the memory addresses corresponding to data to be cached by a processor comprises:
dynamically selecting memory addresses from the set of memory addresses as the subset of memory addresses based on a user process or system behavior.

15. The system of claim 11, wherein providing a request for the processor to cache data corresponding to the subset of the memory addresses for the requested data comprises:
providing an instruction indicating the subset of memory addresses and indicating that the subset of memory addresses are to be cached.

16. The system of claim 11, the operations comprising:
receiving, by the processor, the request for the processor to cache data corresponding to the subset of the memory addresses for the requested data;
selecting, by the processor, the cache of the processor from multiple caches; and
in response to receiving the request for the processor to cache data corresponding to the subset of the memory addresses for the requested data, caching the memory addresses in the cache of the processor selected by the processor.

17. The system of claim 11, the operations comprising:
in response to receiving the requested data by the input-output device, issuing a DMA write operation indicating the requested data and the memory addresses,
wherein receiving, by the memory controller, the requested data and the set of memory addresses corresponding to the requested data, comprises receiving the DMA write operation.

18. The system of claim 11, wherein storing, by the memory controller, the data for the subset of memory addresses in a cache of the processor and storing remaining data of the received data for the memory addresses in a main memory, comprises:

triggering the processor to store the data for the subset of memory addresses in the cache; and triggering storage of the remaining data of the received data for the memory addresses in the main memory.

19. The system of claim 11, wherein providing a request for the processor to cache data corresponding to the subset of the memory addresses for the requested data, comprises:

providing a request for the processor to cache data corresponding to the subset of the memory addresses for the requested data into a specific partition of the cache.

20. A non-transitory computer-readable medium storing software comprising instructions executable by one or more computers which, upon such execution, cause the one or more computers to perform operations comprising:

providing, by a user process to an input-output device, a request for data that is not yet available, wherein the user process is a software application that uses data received from the input-output device;

in response to providing to the input-output device the request for data that is not yet available, receiving, by the user process and from the input-output device, a set of memory addresses for the requested data that is not yet available;

in response to receiving the set of memory addresses from the input-output device for the requested data that is not yet available, determining, by the user process, a subset of the memory addresses corresponding to data to be cached by a processor;

in response to determining the subset of the memory addresses corresponding to data to be cached by the processor, determining, by the user process, a cache level in which to pre-fetch the subset of memory addresses in a cache of the processor;

providing, by the user process to the processor, a request for the processor to allocate space in the cache of the processor to cache data corresponding to the subset of the memory addresses at the determined cache level for the requested data that is not yet available;

after providing the request for the processor to allocate space to cache data corresponding to the subset of the memory addresses for the requested data and once the requested data is available, receiving, by a memory controller, a direct memory access write operation from the input-output device indicating the requested data and the set of memory addresses corresponding to the requested data;

in response to receiving, by the memory controller, the requested data and the set of memory addresses corresponding to the requested data, determining, by the memory controller, that the received data includes data for the subset of memory addresses that the processor has been requested by the user process to cache;

in response to determining that the received data includes the data for the subset of memory addresses that the processor has been requested by the user process to cache, storing, by the memory controller, the data for the subset of memory addresses in the allocated space of the cache of the processor and storing remaining data of the received data for the memory addresses in a main memory; and as the data for the subset of memory addresses in the allocated space of the cache of the processor is being processed by the processor, pre-fetching the remaining data of the received data for the memory addresses in the main memory and storing the remaining data in the cache.

* * * * *

UNITED STATES PATENT AND TRADEMARK OFFICE
CERTIFICATE OF CORRECTION

PATENT NO. : 10,055,350 B2
APPLICATION NO. : 14/533307
DATED : August 21, 2018
INVENTOR(S) : Govindaraju et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 79 days.

Signed and Sealed this
Twenty-seventh Day of August, 2019

Andrei Iancu
*Director of the United States Patent and Trademark Office*